United States Patent
Ridge et al.

(10) Patent No.: US 6,738,534 B2
(45) Date of Patent: May 18, 2004

(54) APPARATUS, AND ASSOCIATED METHOD, FOR ALTERING THE RESOLUTION OF A DIGITAL IMAGE

(75) Inventors: Justin Ridge, Sachse, TX (US); Stephane Coulombe, Irving, TX (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/066,501

(22) Filed: Jan. 31, 2002

(65) Prior Publication Data

US 2003/0142886 A1 Jul. 31, 2003

(51) Int. Cl.[7] .............................. G06K 9/32; G06K 9/36

(52) U.S. Cl. ...................... 382/299; 382/276; 382/284

(58) Field of Search ................................. 382/232, 233, 382/250, 258, 259, 266, 276, 277, 298, 284, 299, 264, 300, 312; 345/428, 596, 660, 673

(56) References Cited

U.S. PATENT DOCUMENTS

| | | | | |
|---|---|---|---|---|
| 5,621,826 A | * | 4/1997 | Katayama et al. | 382/299 |
| 5,703,965 A | * | 12/1997 | Fu et al. | 382/232 |
| 5,754,162 A | * | 5/1998 | Cahill, III | 345/660 |
| 5,930,410 A | * | 7/1999 | Webb et al. | 382/312 |
| 6,021,256 A | * | 2/2000 | Ng et al. | 358/1.9 |
| 6,043,802 A | * | 3/2000 | Gormish | 345/596 |
| 6,141,456 A | * | 10/2000 | Pearlstein et al. | 382/250 |

* cited by examiner

*Primary Examiner*—Andrew W. Johns
*Assistant Examiner*—Amir Alavi

(57) ABSTRACT

Apparatus, and an associated method, for reducing the resolution of a digital image, such as a JPEG image. The digital image is pre-scaled by a pre-scaling factor that is selected such that a matrix multiplication is performed upon the digital image once pre-scaled, to reduce the resolution of the image. The matrix multiplication utilizes a multiplier that exhibits symmetry, thereby to reduce the number of calculations required to reduce the resolution of the image. Resolution reduction is performed, for instance, prior to communicating the digital image to a mobile station operable in a mobile communication system.

18 Claims, 10 Drawing Sheets

| $X_1$ Block 1 | $X_2$ Block 2 | $X_3$ Block 3 | $X_4$ Block 4 |
|---|---|---|---|
| $X_5$ Block 5 | $X_6$ Block 6 | $X_7$ Block 7 | $X_8$ Block 8 |
| $X_9$ Block 9 | $X_{10}$ Block 10 | $X_{11}$ Block 11 | $X_{12}$ Block 12 |
| $X_{13}$ Block 13 | $X_{14}$ Block 14 | $X_{15}$ Block 15 | $X_{16}$ Block 16 |

Row (n), Row (n+1), Row (n+2), Row (n+3)

FIG. 8

APPARATUS, AND ASSOCIATED METHOD, FOR ALTERING THE RESOLUTION OF A DIGITAL IMAGE

The present invention relates generally to a manner by which to reduce, or otherwise alter, the resolution of a block-based digital image. More particularly, the present invention relates to apparatus, and an associated method, by which to operate upon the block-based digital image such that reduction of the image is effectuated through a matrix multiplication using a multiplier that exhibits symmetry. Reduction of the resolution of the image is readily implementable, and said reduction is effectuated with a reduced complexity relative to conventional manners by which to reduce the resolution of the image. And, the resolution reduction produces an image that exhibits a lessened aliasing than conventional manners used to reduce the resolution of a digital image.

BACKGROUND OF THE INVENTION

The use of a communication system through which to communicate data is a pervasive part of much of modern society. Many different types of communication systems have been developed, implemented, and used to effectuate communication of data pursuant to a communication service.

Generally, a communication system is formed of a sending station and a receiving station interconnected by a communication channel. The sending and receiving stations are positioned remote from one another and, by interconnecting the sending and receiving stations by way of the communication channel, data originated at the sending station is able to be communicated to the remotely-positioned receiving station. A communication station that includes both a sending station and a receiving station permits two-way communication of data, i.e., data originated at the communication station can be communicated elsewhere, and data originated elsewhere can be detected at the communication station.

New types of communication systems have been proposed, developed, and, in some instances, also implemented, that make use of advancements in communication technologies. For instance, communication systems have been proposed for the communication of digital video data formed of digital images. The digital image is formed, for instance, of video frames, and video images, utilized during video conferencing are exemplary of applications that make use of digital images.

A radio communication system is a communication system in which the communication channel is formed of a radio channel. Because a radio channel is employed, a conventional, fixed wireline connection between the sending and receiving station upon which to define the communication channel is obviated. Radio communication systems can be utilized to effectuate the communication of a digital image, or sequences of digital images, between the sending and receiving stations of a radio communication system. Communication of a digital image is a data-intensive procedure as a digital image is formed of a significant amount of data. The data forming the digital image is represented, in part, by dimensions that define the resolution of the digital image.

A digital image stored at one resolution might need to be processed at a different resolution. For example, a high-resolution image might have to be displayed upon a device that is capable of displaying the image at only a lower resolution. A conversion of the image to the lower resolution can be performed at a display device, such as a display device positioned at the receiving station to which the digital image is communicated by the sending station. That is, the conversion can be performed at the receiving station by decoding the image at the stored resolution and then scaling the decoded version in the pixel domain. This type of conversion procedure is typical of procedures conventionally utilized by image viewers associated with conventional personal computers, including web browsers used in conjunction with operations by way of the World Wide Web (WWW).

This type of conversion operation, however, necessitates that the decoding device be capable of processing the image at the stored resolution. That is, the decoding device must have sufficient amounts of memory capacity and sufficient levels of processing capability. This type of procedure also ignores the relatively greater cost of obtaining the image at the stored resolution compared to the displayed resolution.

The digital image might be communicated in a communication system in which a receiving station at which the digital image is to be displayed is of limited memory capacity or processing capability. For instance, mobile communication systems, both those under development, as well as systems that are already installed, make use of mobile stations that are, generally, of limited memory capacity and limited processing capability when compared to fixed-point stations. Increasingly, communication services that are to be effectuated include communication services in which digital images are communicated to the mobile station. Because of the limited memory capacity and processing capability of many mobile stations, conventional manners by which to reduce the resolution of a digital image cannot practically be performed at the mobile station. That is, a mobile station may not be capable of decoding an image stored at a resolution considered "normal" on a conventional personal computer, or even of decoding images generated by other mobile stations. Additionally, costs associated with transmitting a digital image upon a radio link may be significant due to the large amount of data associated with that digital image. Reducing the dimensions of an image prior to its transmission upon the radio link would reduce the amount of data associated with it, thereby providing a cost advantage.

Different mobile stations operable in a mobile communication system, however, might well have different memory capacities and processing capabilities. A sending station located at the network infrastructure of the mobile communications system may be unaware of the capacities and capabilities of the mobile stations to which data is to be communicated. While it is possible for the operator of the network infrastructure to reduce the resolution of an image by decoding it and reducing the resolution in the pixel domain, then re-encoding the image, this is an unnecessarily complex method, because the operator does not intend to view the image; the operator, and the network infrastructure controlled by the operator, act simply as a conduit of the image.

As many digital images might well have to be converted to lower resolution images, the cost of performing a single conversion is incurred repeatedly by the operator, so that in total, a large amount of processing might have to be performed. A manner is, therefore, required by which to provide an efficient method by which to reduce the resolution of a digital image.

It is in light of this background information, related to the communication of digital images in a communication system, that the significant improvements of the present invention have evolved.

SUMMARY OF THE INVENTION

The present invention, accordingly, advantageously provides apparatus, and an associated method, by which to reduce, or otherwise alter, a block-based digital image.

Through operation of an embodiment of the present invention, a manner is provided by which to operate upon the block-based digital image such that reduction of the resolution of the image is effectuated through a matrix multiplication using a matrix multiplier that exhibits symmetry. Reduction of the resolution of the image is readily implementable and the reduction is performed with lessened levels of complexity in contrast to conventional manners by which to reduce the resolution of the digital image.

Because the matrix multiplication is performed utilizing a symmetric matrix multiplier, reduced amounts of temporary, e.g., intermediate-stage, data is generated, thereby reducing complexity of the reduction operations. Additionally, low pass, DCT (discrete cosine transform) coefficients are utilized without the need for filtering, again facilitating a reduction in the complexity of the operations required to reduce the resolution of the digital image.

As a result of the reduced complexity of operations, a reduced-resolution image is formed more quickly than conventional manners by which to reduce the resolution of the digital image.

In one aspect of the present invention, a manner by which to reduce the image resolution of a digital image is provided. The digital image is a compressed image, utilizing a block-based transform, such as a DCT (discrete cosine transform), wherein the reduction is by a factor that is a power of two. A transform, such as the aforementioned discrete cosine transform, is utilized in conventional image compression standards, such as the JPEG standard.

Improved efficiency of resolution-reduction operations occurs because less processing time is required to perform the resolution-reduction operation.

In another aspect of the present invention, the block-based digital image is formed of one or more groups of two separate blocks that are provided to separate operational paths of resolution-reduction apparatus. Pre-scaling is performed upon the separate blocks in manners such that a central reduction stage forms a matrix multiplication process wherein a matrix multiplier is utilized. The matrix multiplier is highly symmetric, viz., both rows and columns of the matrix multiplier are divisible into pairs with only one multiplication being required for the pair. In contrast, conventionally, a separate multiplication is required to be performed for each element.

In another aspect of the present invention, dequantization and requantization stages are eliminated and are, instead, merged with pre-scaling and post-scaling stages, respectively. Through this merging of operations, the number of multiplications required to reduce the resolution of the block-based digital image is decreased significantly.

In one implementation, the digital image is reduced in resolution pursuant to effectuation of a communication service with a mobile station, such as a cellular mobile station operable in a cellular-like communication system. The digital image, in compressed form, is provided to the network part of the communication system, at which the resolution of the digital image is reduced, prior to its communication by the network over a radio link to the mobile station. Because the reduction in resolution is performed at the network, the operations otherwise required to be performed at the mobile station are obviated. And, because the reduction in the resolution of the digital image is performed efficiently, processing required at the network to perform the reduction in resolution of the digital image is reduced relative to the processing that would otherwise be required to perform such operation utilizing conventional techniques.

In these and other aspects, apparatus, and an associated method, is provided for a device that operates upon a block-based digital image. The digital image exhibits an initial resolution. The block-based digital image defines at least a first block of a first dimension. The initial resolution of the digital image is selectively reduced to a first-reduced resolution. A prescaler is coupled to receive indications of each block that together define the block-based digital image. The prescaler scales the indications of each block of the block-based digital image to form a first-scaled variant representation of each block of the block-based digital image. A combiner is coupled to receive the scaled variant representative of each block of the block-based digital image. The combiner combines the scaled variant representation of each block together to form a combined representation of the scaled variant representation of each block of the block-based digital image. A reducer is coupled to receive the combined representation formed by the combiner. The reducer reduces the combined representation in resolution to a reduced-resolution representation of the combined representation of the first-reduced resolution.

A more complete appreciation of the present invention and the scope thereof can be obtained from the accompanying drawings which are briefly summarized below, the following detailed description of the presently-preferred embodiments of the invention, and the appended claims.

BRIEF DESCRIPTION OF THE DRAWINGS

FIG. 8 illustrates a representation of a sixteen-block digital image that is reduced in resolution by a factor of four pursuant to operation of an embodiment of the present invention.

DETAILED DESCRIPTION

Figure 1:
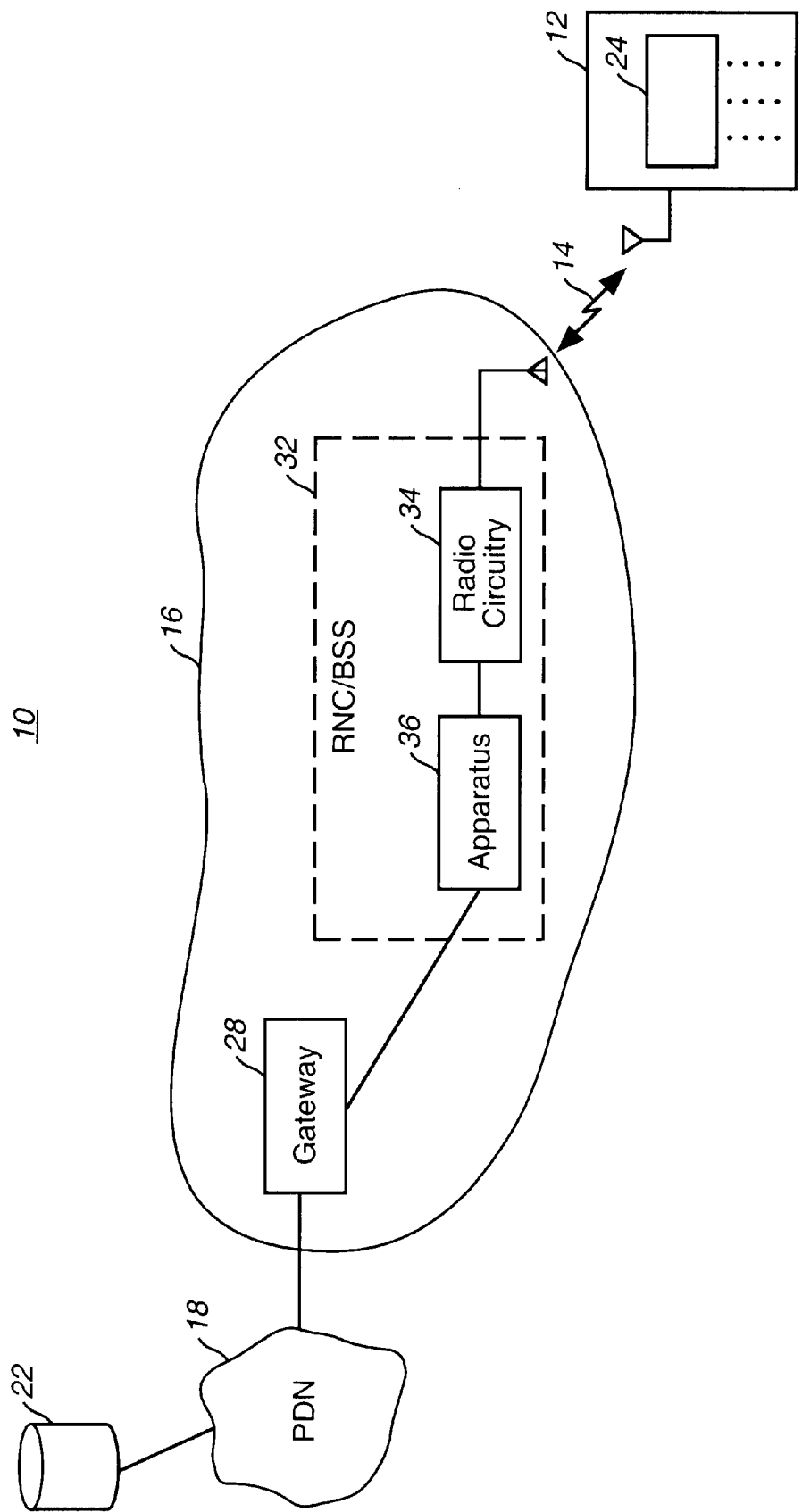
FIG. 1 illustrates a functional block diagram of a communication system in which an embodiment of the present invention is operable for reducing the resolution of a digital image prior to communication thereof upon a communication channel to a receiving station.

Referring first to FIG. 1, a communication system, shown generally at 10, is operable to communicate data to a mobile station 12 by way of communication channels defined upon a radio link 14. In the exemplary implementation, the communication system 10 forms a mobile communication system, such as, or analogous to, a cellular communication system that provides for the communication of digital images to the mobile station. It should be understood, though, that an embodiment of the present invention is analogously implementable in other systems and that the following description of the implementation of an embodiment of the present invention in a cellular communication system is exemplary.

The communication system is here shown to include a network part, including a radio access network 16 and a packet data network (PDN) 18, such as the Internet. A data source 22 is coupled to the packet data network. The data source emanates digital images that are to be communicated to the mobile station to be displayed at a display device 24 forming part of, or otherwise associated with, the mobile station. As noted above, the processing capability and memory capacity of the mobile station is limited, and the display size of the display device 24 is may be smaller than the dimensions of the digital image originated at the data source. The resolution of such a digital image must, therefore, be reduced to permit its display on the display device.

The radio access network 16 is here shown to include a gateway 28 that connects the radio access network with the packet data network. The radio access network is further shown to include a radio network controller and base station system (RNC/BSS), here including radio circuitry 34 and the apparatus 36 of an embodiment of the present invention. The apparatus 36 operates to reduce the resolution of digital images provided thereto prior to their transmission upon the radio link to the mobile station. Because the digital image is operated upon prior to its communication upon the radio link, lack of processing capability or memory capacity at the mobile station does not limit the operations performed by the apparatus. And, as the method of resolution reduction is efficient, the operation upon the digital image is completed more quickly compared to operation upon that same digital image using conventional manners by which to reduce the resolution of a digital image.

Figure 2:
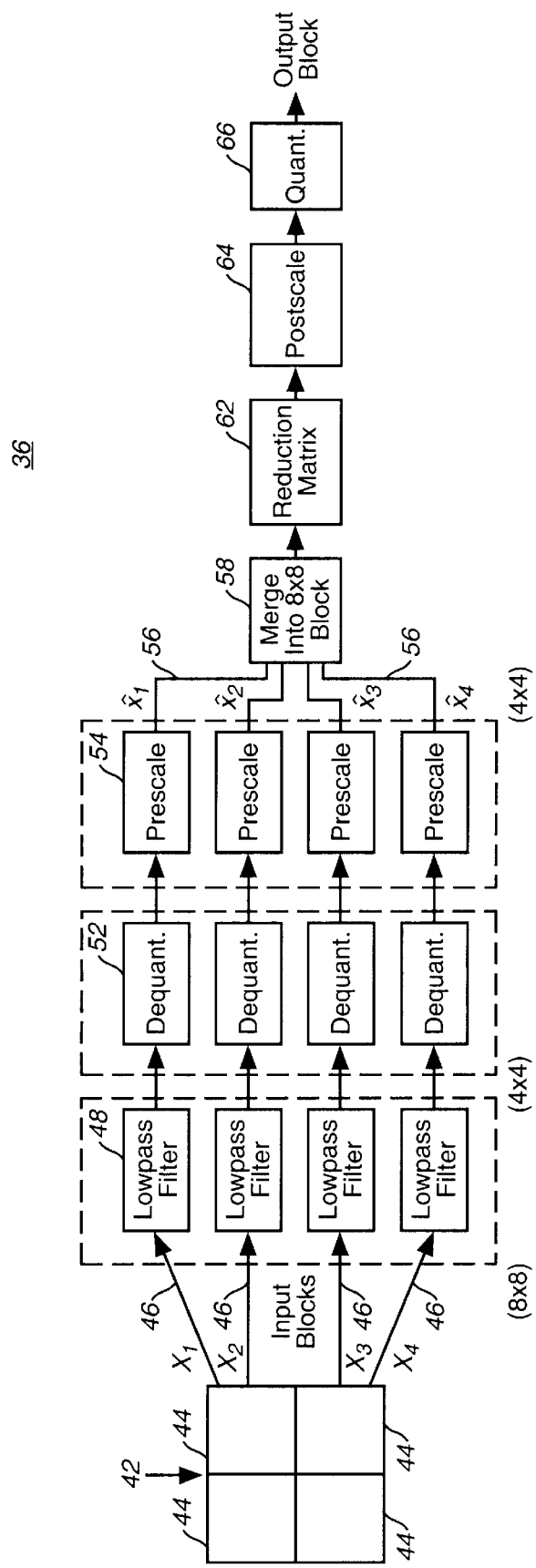
FIG. 2 illustrates a functional block diagram of an embodiment of the present invention for reducing the resolution of a digital image.

FIG. 2 illustrates the apparatus 36 of an embodiment of the present invention and exemplary digital image 42 is also shown in the figure. The image is a block-based, compressed image, shown here as an example divided into four blocks 44. Indications of separate ones of the blocks are provided, here by way of the lines 46, to the apparatus 36. The apparatus 36 is here represented by functional elements, the operations of which are implementable in any desired manner, such as, e.g., algorithms executable by appropriate processing circuitry. And, while the apparatus 32 shown to form part of the RNC/BSS 32, the elements of the apparatus, in alternative embodiments, are implemented elsewhere, or distributed amongst several elements.

Here, the apparatus includes a low pass filter stage 48 formed of low pass filter elements separately coupled to different ones of the lines 46. A dequantization stage 52 is positioned subsequent to the filter stage 48. Again, a plurality of separate dequantization functions corresponding to the separate low pass filter functions of the filter stage 48 form the dequantization stage 52. Pixel-domain representations x̂, are generated on the lines 56 and are applied to a merging element 58 that merges the indications, generated on the separate lines, into a single block.

Thereafter, indications of the single block representative of the multiple-block input to the apparatus 36 are provided to a reduction matrix 62 at which the resolution reduction of the block is performed. Thereafter, a post-scaler 64 performs post-scaling operations upon the reduced matrix formed by the reduction matrix 62. And, subsequent to post-scaling, quantization is performed by a quantization stage 66.

Pre-scaling and post-scaling factors associated with the pre-scaling and post-scaling stages 54 and 64, respectively, are selected such that the central reduction stage of the reduction matrix becomes a matrix multiplication operation in which the multiplier forms a symmetric matrix. Such symmetry refers to both the rows and columns of the multiplier matrix being divisible into pairs in which only a single multiplication is required for the pair. In contrast, conventionally, a separate multiplication would be required for each element.

For instance, when the digital image 42 forms a JPEG image, the quantization factors for each DCT (discrete cosine transform) coefficient are not linear in either the horizontal or vertical directions. Spatial operations, such as resolution reduction, cannot be performed on the quantized coefficients. Because quantization and dequantization each involve multiplication operations, these operations contribute towards the processing required for the resolution reduction to be effectuated.

Figure 3:
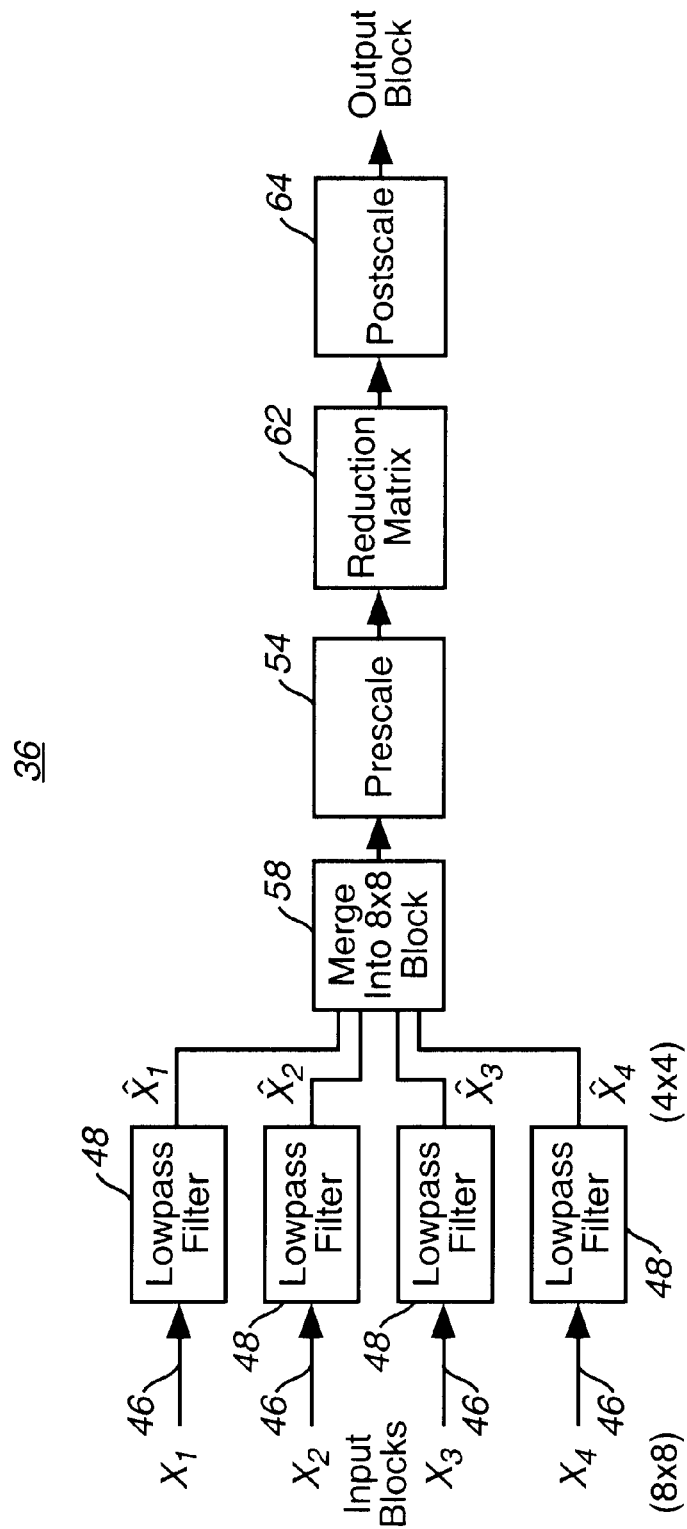
FIG. 3 illustrates a functional block diagram, similar to that shown in FIG. 2, but here in which several operations of the embodiment shown in FIG. 2 are merged into a single stage.

FIG. 3 illustrates the apparatus 36 of another embodiment of the present invention. In this embodiment, the apparatus further eliminates the dequantization and requantization stages by merging such stages with the pre-scaling and post-scaling stages. Elements that otherwise correspond with the elements shown in the implementation shown in FIG. 2 are commonly-referenced. By merging the dequantization and requantization stages into the pre-scaling and post-scaling stages, further reduction in the number of multiplication operations that must be performed to reduce the resolution of the digital image is permitted.

Figure 4:
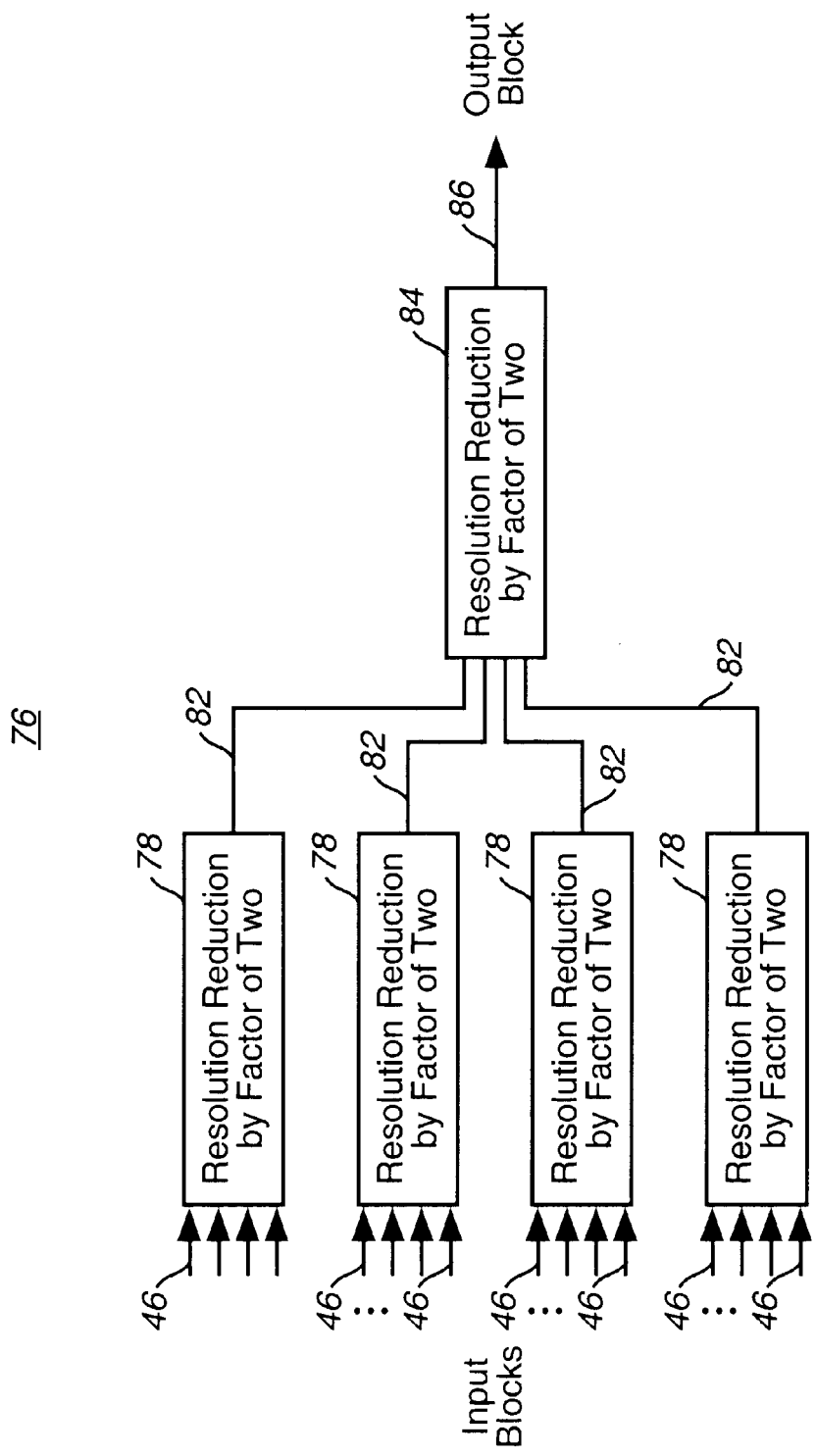
FIG. 4 illustrates a functional block diagram of an embodiment of the present invention by which to reduce the resolution of a digital image by a factor of four.

FIG. 4 illustrates a representation, shown generally at 76, of the manner by which a four-fold reduction in the resolution of the digital image can be effectuated. Here, four stages 78 are positioned in cascade. The stages each operate to reduce the image resolution of indications of input blocks generated on the lines 46 to form first-stage output image representations on the lines 82. The lines 82 are, in turn, coupled to a single second-stage element 84 that reduces, also by a factor of two, the input blocks provided thereto by way of the lines 82. The reduced-resolution image generated on the line 86 is, thereby, reduced in resolution by a factor of four relative to the inputs provided thereto.

Figure 5:
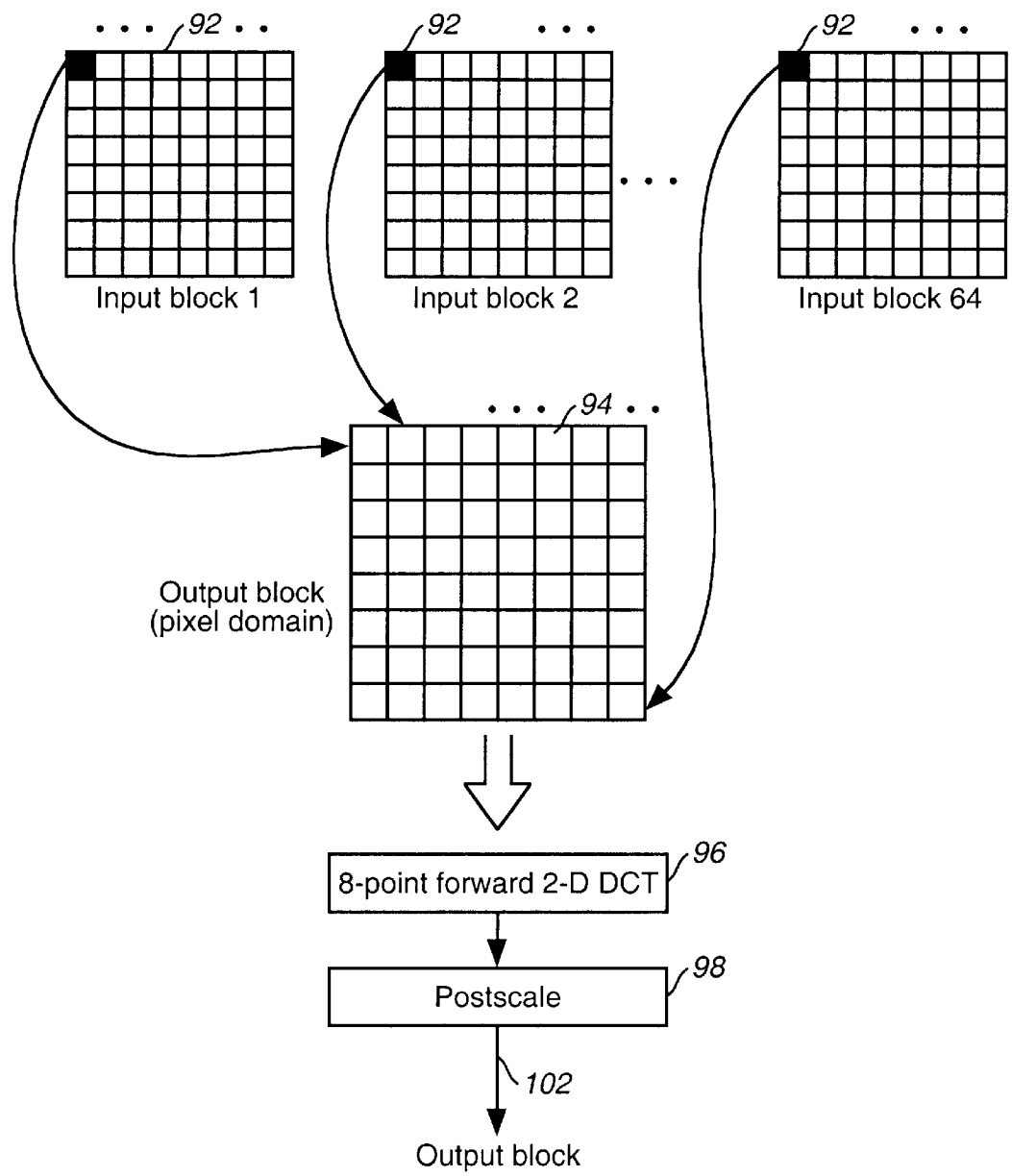
FIG. 5 illustrates a functional block diagram, analogous to that shown in FIG. 4, but here representative of a manner by which to reduce the resolution of a digital image by a factor of eight.

FIG. 5 represents a manner by which an eight-fold reduction in the resolution of a block-based digital image is effectuated pursuant to an embodiment of the present invention. Here, input blocks 92 populate the blocks 94 of a resultant output block, in the pixel domain. Once the output block is formed, an eight point forward, two-dimensional discrete cosine transform is performed, indicated by the function 96. And, thereafter, post-scaling, indicated by the function 98, is performed to form a resultant output block generated on the line 102.

As the DCT terms of sixty-four blocks, i.e., eight horizontal blocks by eight vertical blocks, can be grouped to form a scaled, pixel-domain representation of the original, as shown in the figure, eight-fold resolution reduction is straightforward. The resultant image need only be converted to a frequency domain using a forward DCT. Because only DCT terms are used, the non-linearity of a JPEG quantization is not a factor, and operations can be performed upon quantized coefficients.

Mathematically, the procedure of an embodiment of the present invention considers the concentration of energy in 4×4 low pass coefficients to be present in every image block. Based on this consideration, the basic equation for the reduction by a factor of two is as follows:

$$X = D_q [(A_{X_{+++}} + B_{X_{+--}})A^t + (A_{X_{-+-}} + B_{X_{--+}})B^t] D_q^t$$

The resolution reduction is effectuated with reduced complexity as permutations are not required, nor is filtering of the 4×4 low pass coefficients required. Additionally, an improved image that exhibits less of an aliasing effect is provided. Additionally, because a two-dimensional, four-point DCT is utilized, a 4×4 pixel domain representation results. The amount of data therefore does not expand during calculation operations.

When an image is block-based, resolution reduction by a factor of M can be achieved by combining $M^2$ blocks of a given dimension, M in the horizontal direction and M in the vertical direction, or M×M, into a single block of the same dimension. For example, if M=2, one output block is generated for every four input blocks. Let the coefficients in the four input blocks be represented as matrices, shown graphically as the blocks 44 of the input 42 in FIG. 1:

In this case, the single output block is determined by finding an 8×8 pixel domain representation of a combination of the four input blocks, and then taking the DCT of that pixel domain representation. If T is an 8×8 matrix corresponding to the 8-point forward DCT operation, i.e.:

$$T = \begin{bmatrix} 1 & 1 & 1 & 1 & 1 & 1 & 1 & 1 \\ \cos\frac{\pi}{16} & \cos3\frac{\pi}{16} & \cos5\frac{\pi}{16} & \cos7\frac{\pi}{16} & -\cos7\frac{\pi}{16} & -\cos5\frac{\pi}{16} & -\cos3\frac{\pi}{16} & -\cos\frac{\pi}{16} \\ \cos\frac{\pi}{8} & \cos3\frac{\pi}{8} & -\cos3\frac{\pi}{8} & -\cos\frac{\pi}{8} & -\cos\frac{\pi}{8} & -\cos3\frac{\pi}{8} & \cos3\frac{\pi}{8} & \cos\frac{\pi}{8} \\ \cos3\frac{\pi}{16} & -\cos7\frac{\pi}{16} & -\cos\frac{\pi}{16} & -\cos5\frac{\pi}{16} & \cos5\frac{\pi}{16} & \cos\frac{\pi}{16} & \cos7\frac{\pi}{16} & -\cos3\frac{\pi}{16} \\ \frac{1}{\sqrt{2}} & \frac{-1}{\sqrt{2}} & \frac{-1}{\sqrt{2}} & \frac{1}{\sqrt{2}} & \frac{1}{\sqrt{2}} & \frac{-1}{\sqrt{2}} & \frac{-1}{\sqrt{2}} & \frac{1}{\sqrt{2}} \\ \cos5\frac{\pi}{16} & -\cos\frac{\pi}{16} & \cos7\frac{\pi}{16} & \cos3\frac{\pi}{16} & -\cos3\frac{\pi}{16} & -\cos7\frac{\pi}{16} & \cos\frac{\pi}{16} & -\cos5\frac{\pi}{16} \\ \cos3\frac{\pi}{8} & -\cos\frac{\pi}{8} & \cos\frac{\pi}{8} & -\cos3\frac{\pi}{8} & -\cos3\frac{\pi}{8} & \cos\frac{\pi}{8} & -\cos\frac{\pi}{8} & \cos3\frac{\pi}{8} \\ \cos7\frac{\pi}{16} & -\cos5\frac{\pi}{16} & \cos3\frac{\pi}{16} & -\cos\frac{\pi}{16} & \cos\frac{\pi}{16} & -\cos3\frac{\pi}{16} & \cos5\frac{\pi}{16} & -\cos7\frac{\pi}{16} \end{bmatrix}$$

(ignoring normalization), then these two operations can be written as $X = T.f(X_1, X_2, X_3, X_4).T^t$, where $f$ is the function which produces an 8×8 pixel domain block from the four input coefficient blocks 44.

In an existing algorithm, it is suggested that $f$ should conceptually be an 8-point inverse DCT followed by downsampling, e.g. $f_M = \Sigma_{i=1..4} D(T^t X_i T)$. Even allowing for the "special case" assumption that only the 4×4 lowest frequency coefficients of $X_i$ are non-zero, this means that a full 8×8 pixel block is produced, and downsampling and addition must be applied to all 64 pixels.

By contrast, pursuant to an embodiment of the present invention, filtering is performed first, so that an 8×8 coefficient block $X_i$ leads to a lowpass 4×4 variant:

$$\hat{X}_i = [I_4 \; O_4] X_i \begin{bmatrix} I_4 \\ O_4 \end{bmatrix},$$

where $I_n$ is an n×n identity matrix and $O_n$ is an n×n null matrix. Then by using a four-point inverse DCT, the function $f$ for this invention is expressed as:

$$f(X_1, X_2, X_3, X_4) = \begin{bmatrix} T_4^t \hat{X}_1 T_4 & T_4^t \hat{X}_2 T_4 \\ T_4^t \hat{X}_3 T_4 & T_4^t \hat{X}_4 T_4 \end{bmatrix},$$

and thus $$X = T \begin{bmatrix} T_4^t \hat{X}_1 T_4 & T_4^t \hat{X}_2 T_4 \\ T_4^t \hat{X}_3 T_4 & T_4^t \hat{X}_4 T_4 \end{bmatrix} T^t.$$

Optimization of this concept leads to a significant computational savings when compared to existing methods. The matrix T is rewritten as a combination of a 'left half' and 'right half' as follows:

$$T_L = T \begin{bmatrix} I_8 \\ O_8 \end{bmatrix}, \; T_R = T \begin{bmatrix} O_8 \\ I_8 \end{bmatrix}$$

then:

-continued $$X = T \begin{bmatrix} T_4^t \hat{X}_1 T_4 & T_4^t \hat{X}_2 T_4 \\ T_4^t \hat{X}_3 T_4 & T_4^t \hat{X}_4 T_4 \end{bmatrix} T^t$$

$$= [T_L \; T_R] \begin{bmatrix} T_4^t \hat{X}_1 T_4 & T_4^t \hat{X}_2 T_4 \\ T_4^t \hat{X}_3 T_4 & T_4^t \hat{X}_4 T_4 \end{bmatrix} \begin{bmatrix} T_L^t \\ T_R^t \end{bmatrix}$$

$$= (T_L T_4^t) \hat{X}_1 (T_L T_4^t)^t + (T_L T_4^t) \hat{X}_2 (T_R T_4^t)^t + (T_R T_4^t) \hat{X}_3 (T_L T_4^t)^t + (T_R T_4^t) \hat{X}_4 (T_R T_4^t)^t$$

This assumes that the coefficient matrices have already been dequantised, and will be re-quantised following the operation. This is generally necessary because compression schemes such as JPEG may use different quantiser step sizes for each coefficient in a block, and there is not necessarily any relationship between that step size and coefficient frequency.

An approach used in the AAN DCT algorithm is utilized. The approach involves pre-scaling the input coefficients for an inverse DCT, or post-scaling the output coefficients for a forward DCT. Because both a forward and inverse DCT are needed, both pre- and post-scaling are used. The motivation of such scaling is to ensure that elements in one row (or column) are offset by an integer multiple of coefficients.

For example, two equations, $y_1=0.6533c_1+0.2706c_3$ and $y_2=0.2706c_1+0.6533c_3$ are considered. Normally, four multiplications would be required to evaluate these two equations. However, when coefficients $c_1$ and $c_3$ are pre-scaled by 1.5307 and 3.6955 respectively, the two equations become $\tilde{y}_1=c_1+c_3$ and $\tilde{y}_2=0.4142c_1+2.4142c_3=0.4142(c_1+c_3)+2c_3$. Evaluating these two equations would require only one multiplication by 0.4142 (since $2c_3=c_3+c_3$), in addition to the two pre-scaling multiplications.

Since coefficients must be dequantised prior to transcoding, and then re-quantised afterwards, the pre- and post-scaling operations can be combined with the quantisation, resulting in no added overall complexity.

The pre-scaling factor used for the $(i,j)^{th}$ coefficient is given by $D_{u(i,i)}D_{u(j,j)}$, where $D_u$ is a 4×4 diagonal matrix and $$D_{u(k,k)}^{-1} = \begin{cases} 1, & k=1 \\ \sqrt{2}\cos\left(\dfrac{k\pi}{8}\right), & \text{otherwise} \end{cases}$$

so the coefficients of the reduced block will be:

$$X = (T_L T_4^t) D_u D_u^{-1} \hat{X}_1 D_u^{-t} D_u^t (T_L T_4^t)^t + (T_L T_4^t) D_u D_u^{-1} \hat{X}_2 D_u^{-t} D_u^t (T_R T_4^t)^t +$$
$$(T_R T_4^t) D_u D_u^{-1} \hat{X}_3 D_u^{-t} D_u^t (T_L T_4^t)^t + (T_R T_4^t) D_u D_u^{-1} \hat{X}_4 D_u^{-t} D_u^t (T_R T_4^t)^t$$
$$= M D_u^{-1} \hat{X}_1 D_u^{-t} M^t + M D_u^{-1} \hat{X}_2 D_u^{-t} N^t + N D_u^{-1} \hat{X}_3 D_u^{-t} M^t +$$
$$N D_u^{-1} \hat{X}_4 D_u^{-t} N^t$$

where $M=(T_L T_4^t)D_u$ and $N=(T_R T_4^t)D_u$.

Because of the symmetry in the DCT transform matrix, there is a close relationship between M and N. Let us form two new matrices, $$\tilde{A} = \frac{M+N}{2} \text{ and } \tilde{B} = \frac{M-N}{2}.$$

The implementation equation can now be rewritten as $$X = (\tilde{A}+\tilde{B})D_u^{-1}\hat{X}_1 D_u^{-t}(\tilde{A}+\tilde{B})^t + (\tilde{A}+\tilde{B})D_u^{-1}\hat{X}_2 D_u^{-t}(\tilde{A}-\tilde{B})^t +$$
$$(\tilde{A}-\tilde{B})D_u^{-1}\hat{X}_3 D_u^{-t}(\tilde{A}+\tilde{B})^t + (\tilde{A}-\tilde{B})D_u^{-1}\hat{X}_4 D_u^{-t}(\tilde{A}-\tilde{B})^t$$
$$= [(\tilde{A}+\tilde{B})D_u^{-1}\hat{X}_1 + (\tilde{A}+\tilde{B})D_u^{-1}\hat{X}_2 + (\tilde{A}-\tilde{B})D_u^{-1}\hat{X}_3 +$$
$$(\tilde{A}-\tilde{B})D_u^{-1}\hat{X}_4]D_u^{-t}\tilde{A}^t + [(\tilde{A}+\tilde{B})D_u^{-1}\hat{X}_1 - (\tilde{A}+\tilde{B})D_u^{-1}\hat{X}_2 +$$
$$(\tilde{A}-\tilde{B})D_u^{-1}\hat{X}_3 - (\tilde{A}-\tilde{B})D_u^{-1}\hat{X}_4]D_u^{-t}\tilde{B}^t$$
$$= [\tilde{A}(D_u^{-1}\hat{X}_1 + D_u^{-1}\hat{X}_2 + D_u^{-1}\hat{X}_3 + D_u^{-1}\hat{X}_4) + \tilde{B}(D_u^{-1}\hat{X}_1 +$$
$$D_u^{-1}\hat{X}_2 - D_u^{-1}\hat{X}_3 - D_u^{-1}\hat{X}_4)]D_u^{-t}\tilde{A}^t + [\tilde{A}(D_u^{-1}\hat{X}_1 - D_u^{-1}\hat{X}_2 +$$
$$D_u^{-1}\hat{X}_3 - D_u^{-1}\hat{X}_4) + \tilde{B}(D_u^{-1}\hat{X}_1 - D_u^{-1}\hat{X}_2 - D_u^{-1}\hat{X}_3 +$$
$$D_u^{-1}\hat{X}_4)]D_u^{-t}\tilde{B}^t$$

Note that the parentheses simply involve summations of the pre-scaled coefficients, which can be represented in the more compact form $$X_{+++} = (D_u^{-1}\hat{X}_1 + D_u^{-1}\hat{X}_2 + D_u^{-1}\hat{X}_3 + D_u^{-1}\hat{X}_4)D_u^{-t}$$
$$X_{+--} = (D_u^{-1}\hat{X}_1 + D_u^{-1}\hat{X}_2 - D_u^{-1}\hat{X}_3 - D_u^{-1}\hat{X}_4)D_u^{-t}$$
$$X_{-+-} = (D_u^{-1}\hat{X}_1 - D_u^{-1}\hat{X}_2 + D_u^{-1}\hat{X}_3 - D_u^{-1}\hat{X}_4)D_u^{-t}$$
$$X_{--+} = (D_u^{-1}\hat{X}_1 - D_u^{-1}\hat{X}_2 - D_u^{-1}\hat{X}_3 + D_u^{-1}\hat{X}_4)D_u^{-t}$$

and thus $$X = (\tilde{A}X_{+++} + \tilde{B}X_{+--})\tilde{A}^t + (\tilde{A}X_{-+-} + \tilde{B}X_{--+})\tilde{B}^t$$

The steps for incorporating post-scaling are almost identical. We use an 8×8 diagonal post-scaling matrix $D_q$ is used where $$D_{q(k,k)}^{-1} = \begin{cases} 1, & k=1 \\ \sqrt{2}\cos\left(\dfrac{k\pi}{16}\right), & \text{otherwise} \end{cases}$$

so that the overall equation can be written as $$X = D_q D_q^{-1} \lfloor (\tilde{A}X_{+++} + \tilde{B}X_{+--})\tilde{A}^t + (\tilde{A}X_{-+-} + \tilde{B}X_{--+})\tilde{B}^t \rfloor D_q^{-t} D_q^t$$
$$= D_q [(AX_{+++} + BX_{+--})A^t + (AX_{-+-} + BX_{--+})B^t]D_q^t$$

Again, since the scaling operation can be combined with quantisation, multiplication by $D_u$ or $D_u^t$ adds no complexity to the algorithm. In this equation, A and B are simply scaled versions of $\tilde{A}$ and $\tilde{B}$ respectively.

While this equation utilizes the same format as that of a conventional implementation equation, the matrices A and B are very different due to the use of a different filter and 4-point transform. Considering them in turn, the matrix A is represented as:

$$A = \begin{bmatrix} 4 & 0 & 0 & 0 \\ 0 & 1-2\cos\frac{3\pi}{8}+\sqrt{2}\cos\frac{\pi}{8} & 0 & 1+2\cos\frac{3\pi}{8}-\sqrt{2}\cos\frac{\pi}{8} \\ 0 & 0 & 0 & 0 \\ 0 & 1+(2+\sqrt{2})\cos\frac{3\pi}{8} & 0 & 1-(2+\sqrt{2})\cos\frac{3\pi}{8} \\ 0 & 0 & 4 & 0 \\ 0 & 1-(2+\sqrt{2})\cos\frac{3\pi}{8} & 0 & 1+(2+\sqrt{2})\cos\frac{3\pi}{8} \\ 0 & 0 & 0 & 0 \\ 0 & 1+2\cos\frac{3\pi}{8}-\sqrt{2}\cos\frac{\pi}{8} & 0 & 1-2\cos\frac{3\pi}{8}+\sqrt{2}\cos\frac{\pi}{8} \end{bmatrix}$$

Using intermediate variables, the matrix can be rewritten as:

$$A = \begin{bmatrix} 4 & 0 & 0 & 0 \\ 0 & 2-K_1 & 0 & K_1 \\ 0 & 0 & 0 & 0 \\ 0 & 2+K_2 & 0 & -K_2 \\ 0 & 0 & 4 & 0 \\ 0 & -K_2 & 0 & 2+K_2 \\ 0 & 0 & 0 & 0 \\ 0 & K_1 & 0 & 2-K_1 \end{bmatrix}$$

where $$K_1 = 1 + 2\cos\frac{3\pi}{8} - \sqrt{2}\cos\frac{\pi}{8} \text{ and } K_2 = (2+\sqrt{2})\cos\frac{3\pi}{8} - 1.$$

Thus to calculate AC, where C is a length 4, a total of two non-trivial multiplications are required:

$K_1 \times (c_1-c_3)$ and $K_2 \times (c_1-c_3)$.

Similarly, B can be represented as:

$$B = \begin{bmatrix} 0 & 0 & 0 & 0 \\ 1+\sqrt{2}+2\cos\frac{\pi}{8} & 0 & 1-\sqrt{2} & 0 \\ 0 & 4 & 0 & 0 \\ 1-\sqrt{2}-2\cos\frac{3\pi}{8} & 0 & 1+\sqrt{2} & 0 \\ 0 & 0 & 0 & 0 \\ 1-\sqrt{2}+2\cos\frac{3\pi}{8} & 0 & 1+\sqrt{2} & 0 \\ 0 & 0 & 0 & 4 \\ 1+\sqrt{2}-2\cos\frac{\pi}{8} & 0 & 1-\sqrt{2} & 0 \end{bmatrix}$$

which can be rewritten using intermediate variables:

$$B = \begin{bmatrix} 0 & 0 & 0 & 0 \\ 1+K_3+K_4 & 0 & 1-K_3 & 0 \\ 0 & 4 & 0 & 0 \\ 1-K_3-K_5 & 0 & 1+K_3 & 0 \\ 0 & 0 & 0 & 0 \\ 1-K_3+K_5 & 0 & 1+K_3 & 0 \\ 0 & 0 & 0 & 4 \\ 1+K_3-K_4 & 0 & 1-K_3 & 0 \end{bmatrix}$$

where $$K_3 = \sqrt{2}, K_4 = 2\cos\frac{\pi}{8} \text{ and } K_5 = 2\cos\frac{3\pi}{8}.$$

Thus a total of three non-trivial multiplications would be required to calculate BC: $K_3 \times (c_0-c_2)$, $K_4 \times c_0$, and $K_5 \times 4\, c_0$.

Note that there are two pre-multiplications by A and two pre-multiplications by B in the implementation equation $X=D_q[(AX_{+++}+BX_{+--})A^t+(AX_{-+-}+BX_{--+})B^t]D_q^t$. For these pre-multiplications, a total of $(2\times2)+(2\times3)=10$ multiplications are required for each column of original coefficients, giving a total of 40. Then for post-multiplying each of the 8 rows by $A^t$ and $B^t$, a further $(2+3)$ multiplications are required, for a total of 40.

Therefore, to reduce the resolution by a factor of two according to this method, 40+40=80 multiplications are required in addition 64 for pre-scaling and 64 for post-scaling, for an overall total of 208 per 4×64 coefficients. This amounts to 0.8125 multiplications per pixel of the original image. The fast implementation corresponding to this invention appears below.

Figure 6:
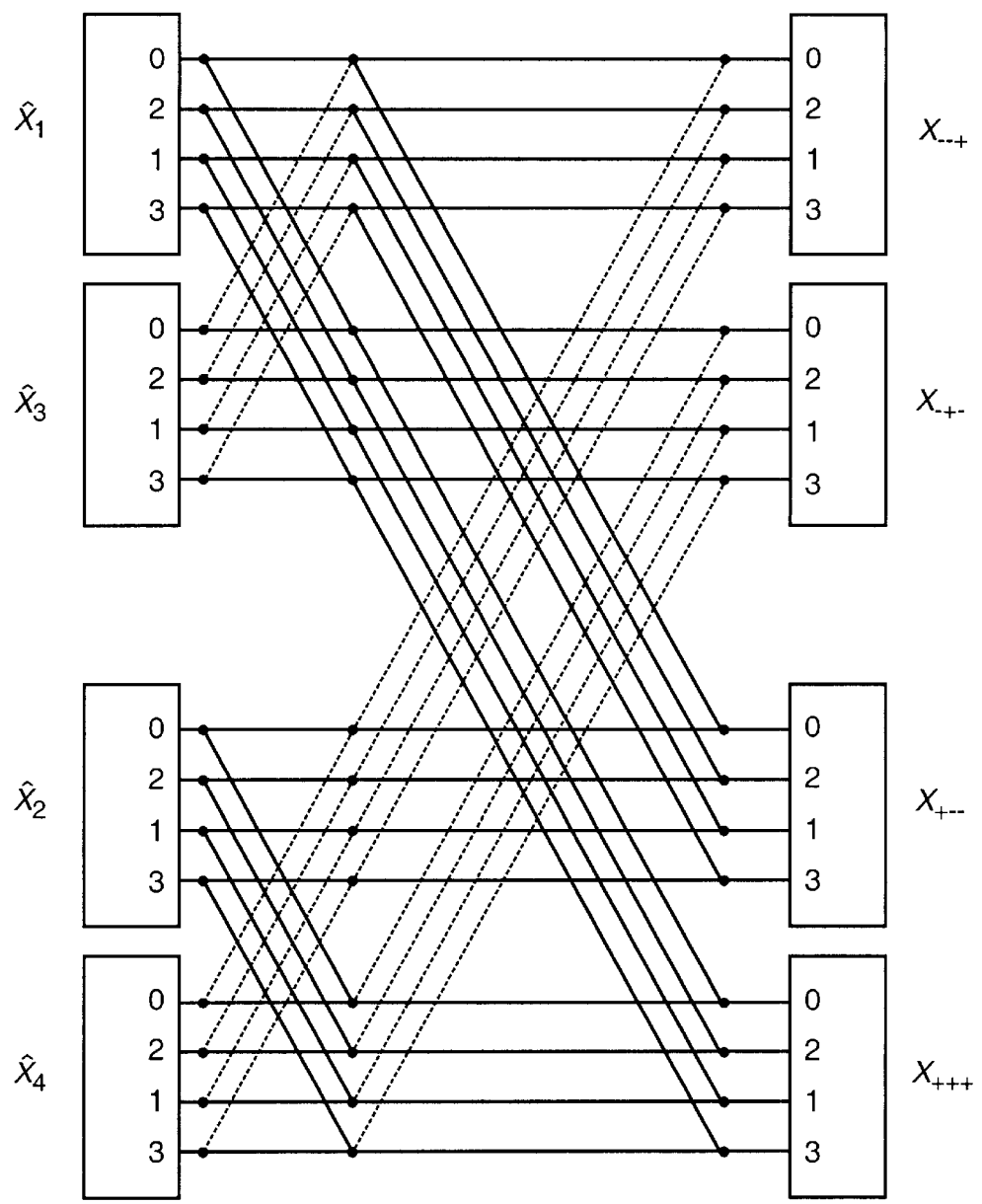
FIG. 6 illustrates a representation of operations by which to calculate sum/difference matrices prior to quantization of the data representative of the digital image pursuant to operation of an embodiment of the present invention.

FIG. 6 illustrates a representation, shown generally at 92, of an implementation of portions of the apparatus 36 of an embodiment of the present invention. Here, calculations of sum/difference matrices, prior to quantization are performed. The operations are performed on each of the column vectors in $\hat{X}_k$ where the index indicates the row number of the matrix. In the figure, diagonal, solid lines are representative of addition operations, and dashed diagonal lines are indicative of subtraction operations. And, the boxes represent multiplication operations, either trivial or non-trivial operations.

Figure 7:
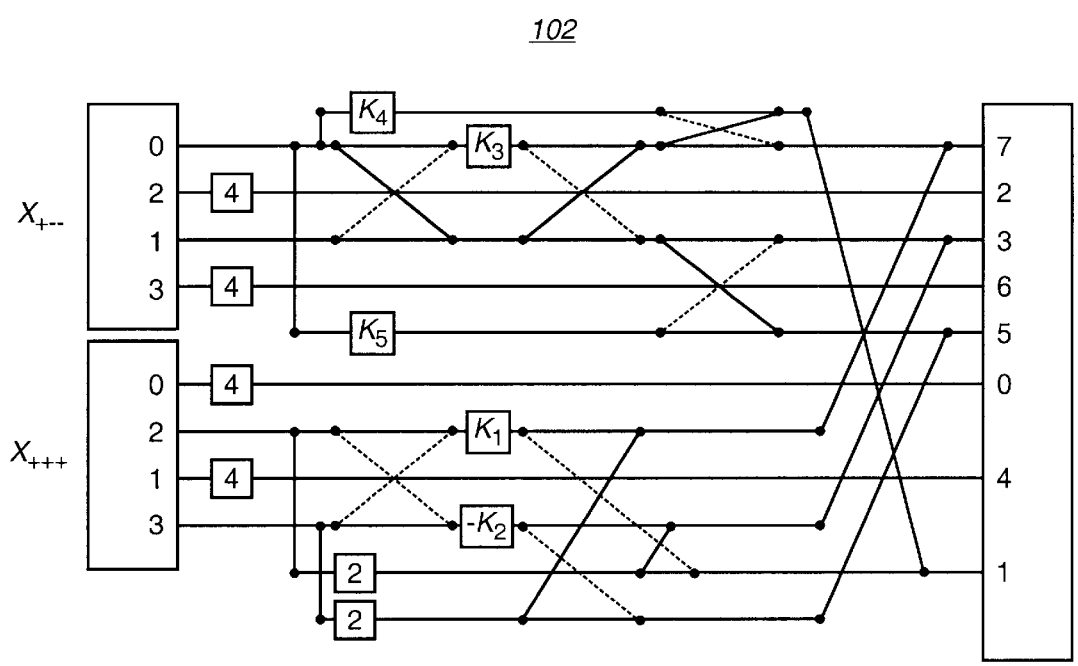
FIG. 7 illustrates a representation of a manner by which to perform pre-multiplication operations pursuant to operation of an embodiment of the present invention.

FIG. 7 illustrates a representation, shown generally at 102, of pre-multiplication operations by the matrices A and B. Pre-multiplication operations are performed sixteen times, four times for each column of the inputs, four times for each of the other outputs, then eight times using transposed results, corresponding to post-multiplication of $A^t$ and $B^t$.

Fast implementation for resolution reduction by a factor of two is provided. This operation takes one input column from each of four blocks and produces two output columns. The operation is repeated for each input column. Finally, the operations, excluding initial butterfly steps, are performed, on each of the rows.

The equation is extendable to consider sixteen input blocks, that is, four horizontal and four vertical blocks, that can be combined to produce a single output block corresponding to a resolution reduction by a factor of four.

FIG. 8 illustrates a digital image 42, here formed of sixteen blocks 44. Here, to reduce the resolution of the image by a factor of four, the DCT matrix is broken down into four components, $T_{LL}$, $T_{LR}$, $T_{RL}$ and $T_{RR}$, so that $T=[T_{LL}\ T_{LR}\ T_{RL}\ T_{RR}]$. Conceptually, a two-point inverse DCT is used, with the reasoning that high-frequency detail is likely to be lost in any event after re-quantization of the reduced image. This leaves four matrices to be simplified:

$(T_{LL}T^t_2)D_u$, $(T_{LR}T^t_2)D_u$, $(T_{RL}T^t_2)D_u$, $(T_{RR}T^t_2)D_u$.

Using a similar process to the one just described, the following implementation is achieved, which (due to the small number of input coefficients from each block) is the same as a fast two-point inverse DCT followed by an eight-point forward DCT.

Figure 9:
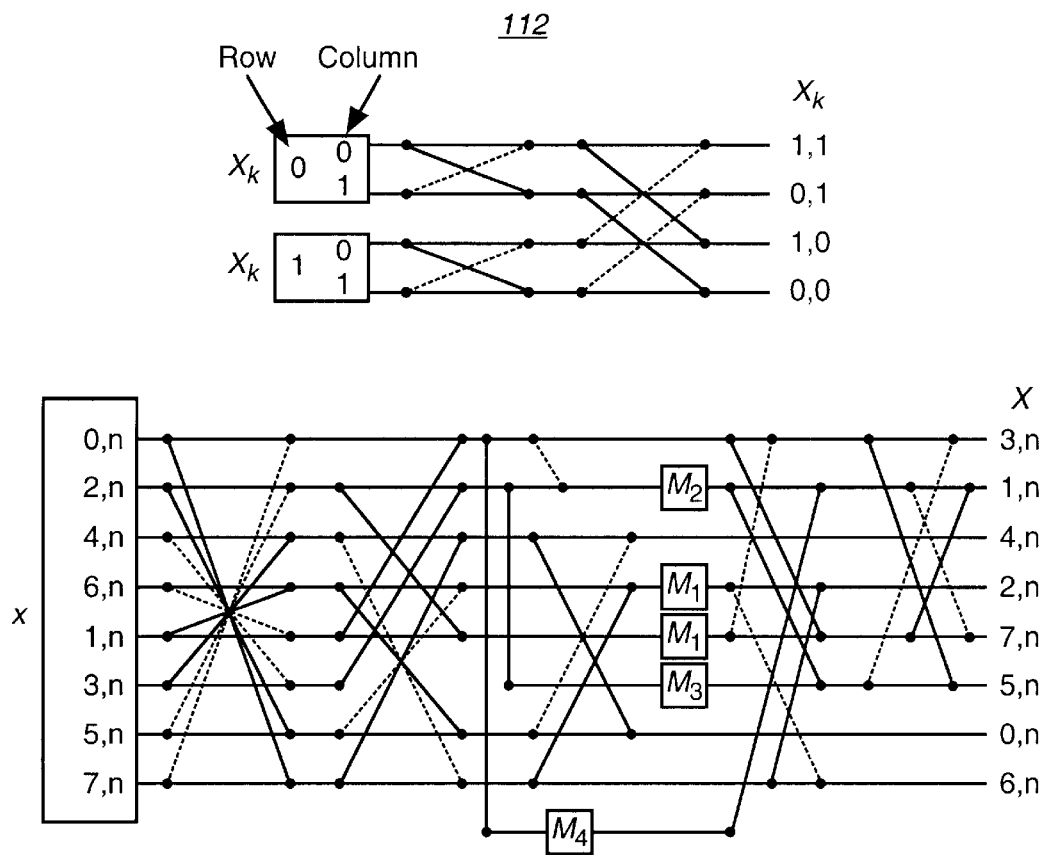
FIG. 9 illustrates a representation of an inverse two-dimensional, discrete cosine transform, performed during operation of an embodiment of the present invention upon each of the blocks of the digital image represented in FIG. 8.

FIG. 9 illustrates a representation, shown generally at 112, of an inverse two-dimensional discrete cosine transform, repeated on each of the sixteen input blocks 44 of the digital image 42 shown in FIG. 8.

Figure 10:
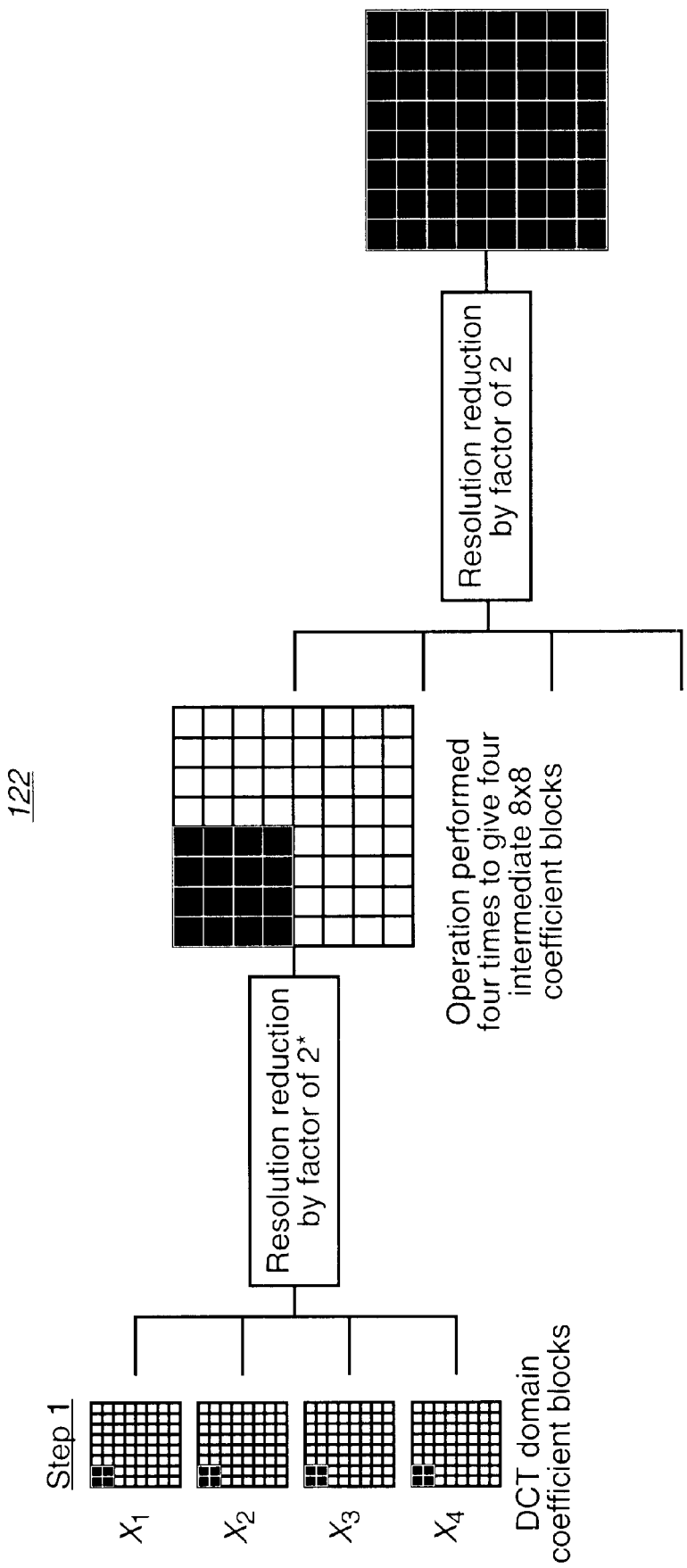
FIG. 10 illustrates a representation, analogous to that shown in FIG. 9, but here of a one-dimensional, discrete cosine transform performed during operation of a further embodiment of the present invention.

And FIG. 10 illustrates a forward, one-dimensional discrete cosine transform, repeated on eight columns generated by the inverse-two-dimensional discrete cosine transform shown in FIG. 9, then on each of the corresponding eight rows.

Reduction by a factor of eight is can be performed by combining the DC coefficients from 64 blocks (8 vertical and 8 horizontal), scaling them and packing them into an 8×8 pixel block. Taking the forward DCT, which is already known to require 80 multiplications according to the AAN method, leads to the desired result.

Two extensions to these concepts also form part of this invention.

Consider the reduction by a factor of two case, where four input blocks are consolidated into one. The method described above assumes that 4×4 of the input coefficients are used from each block, and that the output block measures 8×8.

However, there is no compunction for this to be the case. Clearly, if only the 3×3 or 2×2 lowpass coefficients from the input blocks are non-zero, or if there is little energy in the higher frequency coefficients, we may wish to consider less than 4×4 coefficients from each input.

Starting with the same multiplier matrices A and B as above, and assuming we take the 3×3 lowpass input coefficients, the multipliers become $$A = \begin{bmatrix} 4 & 0 & 0 & 0 \\ 0 & 2-K_1 & 0 & 0 \\ 0 & 0 & 0 & 0 \\ 0 & 2+K_2 & 0 & 0 \\ 0 & 0 & 4 & 0 \\ 0 & -K_2 & 0 & 0 \\ 0 & 0 & 0 & 0 \\ 0 & K_1 & 0 & 0 \end{bmatrix} \quad B = \begin{bmatrix} 0 & 0 & 0 & 0 \\ 1+K_3+K_4 & 0 & 1-K_3 & 0 \\ 0 & 4 & 0 & 0 \\ 1-K_3-K_5 & 0 & 1+K_3 & 0 \\ 0 & 0 & 0 & 0 \\ 1-K_3+K_5 & 0 & 1+K_3 & 0 \\ 0 & 0 & 0 & 4 \\ 1+K_3-K_4 & 0 & 1-K_3 & 0 \end{bmatrix}.$$

Note that, because of the symmetry requirements of the optimization approach, these matrices still require the same number of multiplications per column, i.e. two and three respectively. They are simply applied over fewer columns (three instead of four). Recall that 40 multiplications were required for the columns in the 4×4 case. A total of (2+3)× 2×3=30 are required here, for a savings of 25%. Similarly, if the 2×2 lowpass coefficients are used, the number of multiplications over the columns drops to 20 (a 50% decrease), not because of the algorithm becoming more efficient, but rather because there are fewer columns to consider.

Unfortunately, no matter whether 4×4, 3×3 or 2×2 lowpass coefficients are considered from the inputs, the column operation of the fast algorithm always produces eight values. Consequently, the row "stage" is always performed over eight rows. This erodes the savings gained by considering fewer input coefficients. For example, in the 2×2 case, 20 multiplications are required for the columns, but 40 multiplications are still required for the rows (60 total), meaning that overall, the savings is not the 50% stated above, but rather only 25%.

An embodiment of the present invention proposes that the problem may be solved by not generating a full 8×8 coefficient block for the output. Given that the energy of input blocks is concentrated around the low frequencies in natural images, it is likely that the energy of the output block will have similar characteristics. In other words, if we consider only the 2×2 lowpass coefficients of the input blocks, there is a good chance that the higher-frequency components of the output block will eventually be quantised to zero.

If only the 2×2 lowpass coefficients of the input are considered, we may choose to only generate a 4×4 output block, which is padded to an 8×8 block by inserting zeros for the high-frequency coefficients. This would result in the multiplier matrices $$A = \begin{bmatrix} 4 & 0 & 0 & 0 \\ 0 & 2-K_1 & 0 & 0 \\ 0 & 0 & 0 & 0 \\ 0 & 2+K_2 & 0 & 0 \\ 0 & 0 & 0 & 0 \\ 0 & 0 & 0 & 0 \\ 0 & 0 & 0 & 0 \\ 0 & 0 & 0 & 0 \end{bmatrix} \quad B = \begin{bmatrix} 0 & 0 & 0 & 0 \\ 1+K_3+K_4 & 0 & 0 & 0 \\ 0 & 4 & 0 & 0 \\ 1-K_3-K_5 & 0 & 0 & 0 \\ 0 & 0 & 0 & 0 \\ 0 & 0 & 0 & 0 \\ 0 & 0 & 0 & 0 \\ 0 & 0 & 0 & 0 \end{bmatrix}.$$

which are applied over two columns and four rows, for a total of [(2+2)×2×2 ]+[(2+2)×4]=32 multiplications, a savings of 60%.

In addition to simply reducing the complexity (number of multiplications), this technique also lends itself to a scaleable implementation. Consider the case where resolution is to be reduced by a factor of four. In this case, 16 blocks are read in at a time, as opposed to reduction by a factor of two, where four blocks are read in at a time. We see that (a) the number of blocks to be read varies with the reduction factor, which increases architectural complexity, and (b) the number of blocks increases exponentially with the reduction factor, possibly imposing greater memory requirements.

To avoid these problems, resolution by factors higher than two could be achieved by repeatedly halving the resolution until the desired result is attained. Although this solves the problem, it would be inefficient because many interim values would be generated only to ultimately be eliminated before the output block is stored. A stepped approach is provided. For example, to reduce resolution by a factor of four, there are two steps. Step one involves halving the resolution by taking 2×2 lowpass coefficients from four input blocks, and generating a single 4×4 output block which is padded to 8×8 size using zeros. Step two involves halving the resolution again by taking the 4×4 lowpass coefficients from four input blocks, and generating a single 8×8 output block. Note that the first stage generates 4×4 lowpass coefficients, all of which are used as inputs in the second stage. Thus there are no wasted "intermediate values", in contrast to previous solutions.

In general, for resolution reduction by a factor of N, where N is a power of two, $\log_2 N$ stages are used. For each stage, the E×E lowpass coefficients are taken from each of four input blocks, and a R×R output block is generated, padded to 8×8 size with zeros. Here, $$E = \begin{cases} 4, & k = \log_2 N \\ 2, & k = \log_2 N - 1 \\ 1, & \text{otherwise} \end{cases}$$

$$R = \begin{cases} 2E, & k \geq \log_2 N - 2 \\ 1, & \text{otherwise} \end{cases}$$

where k is the stage number, k=1 . . . $\log_2$ N.

Although performing the operation in a single step can be more efficient, the method of this invention may be preferable for architectural reasons.

The previous descriptions are of preferred examples for implementing the invention, and the scope of the invention should not necessarily be limited by this description. The scope of the present invention is defined by the following claims:

What is claimed is:

1. In a device for operating upon a coefficient block-based digital image that exhibits an initial resolution, the coefficient block-based digital image defining at least a first block of transform coefficients of a first dimension, an improvement of apparatus for selectively reducing the initial resolution exhibited by the coefficient block-based digital image to a first-reduced resolution, said apparatus comprising:
- a prescaler coupled to receive indications of each block of transform coefficients that together define the coefficient block-based digital image, said prescaler for scaling the indications of each block of transform coefficients of the coefficient block-based digital image to form a first scaled variant representation of each block of transform coefficients of the coefficient block-based digital image;
- a combiner coupled to receive the scaled variant representation of each block of transform coefficients of the coefficient block-based digital image, said combiner for combining the scaled variant representation of each block of transform coefficients together to form a combined representation of the scaled variant representation of each block of transform coefficients of the coefficient block-based digital image; and
- a reducer coupled to receive the combined representation formed by said combiner, said reducer performing a matrix multiplication operation by a multiplier upon the combined representation, the multiplier forming a symmetric matrix having rows and columns that are divisible into pairs, said reducer for reducing the combined representation in resolution to a reduced-resolution representation of the combined representation of the first-reduced resolution.

2. The apparatus of claim 1 wherein said prescaler comprises a low pass filter.

3. The apparatus of claim 2 wherein the indications of each block of transform coefficients of the coefficient block-based digital image to which said prescaler is coupled to receive comprises a separate data stream corresponding to each separate block of transform coefficients that together defines the coefficient block-based digital image.

4. The apparatus of claim 3 wherein each separate block of transform coefficients that together define the coefficient block-based digital image is coupled to a separate low pass filter element, a separate data stream applied to a corresponding separate low pass filter element, each separate low pass filter element for scaling and dequantizing the separate data stream applied thereto.

5. The apparatus of claim 4 wherein each low pass filter element forms a separate first scaled variant representation of the block of transform coefficients of the coefficient block-based digital image corresponding to the separate data stream applied thereto.

6. The apparatus of claim 5 wherein at least the first block of transform coefficients of the coefficient block-based digital image comprises four separate blocks of transform coefficients, wherein the separate data stream corresponding to each separate block of transform coefficients comprises four data streams, and wherein said separate low pass filter element comprises four separate low pass filter elements.

7. The apparatus of claim 1 wherein the indications of each block of transform coefficients that together define the coefficient block-based digital image to which said prescaler is coupled to receive comprise block-based transform coefficients of the block-based digital image, and the output of said reducer are block-based transform coefficients.

8. The apparatus of claim 7 wherein the block-based transforms forming the indications of each block of transform coefficients that together define the coefficient block-based digital image to which said prescaler is coupled to receive comprise discrete cosine transform coefficients.

9. The apparatus of claim 1 wherein said combiner forms a multi-stage device that performs a multiple-stage reduction in size of the scaled variant representation to the combined representation.

10. The apparatus of claim 1 wherein the combined representation formed by said combiner comprises a combined-representation matrix, and wherein said reducer reduces the combined-representation matrix by multiplying the combined-representation matrix by the multiplier forming the symmetric matrix, the reduced-size representation formed of the product of the combined-representation matrix and the multiplier.

11. The apparatus of claim 1 further comprising a postscaler coupled to receive the reduced-size representation formed by said reducer, said postscaler for scaling the reduced-size representation to form a first-scaled, reduced representation of the combined representation.

12. The apparatus of claim 11 wherein said postscaler further dequantizes the reduced-size representation formed by said reducer.

13. The apparatus of claim 1 wherein the device that operates upon the block-based digital image comprises a sending station of a radio communication system and wherein said prescaler, said combiner, and said reducer form portions of the sending station.

14. In a method for operating upon a coefficient block-based digital image that exhibits an initial resolution, the coefficient block-based digital image defining at least a first block of transform coefficients of a first dimension, an improvement of a method for selectively reducing the initial resolution exhibited by the coefficient block-based digital image to a first-reduced resolution, said method comprising:
- scaling indications of each block of transform coefficients that together define the coefficient block-based digital image to form a first scaled variant representation of each block of transform coefficients of the coefficient block-based digital image;
- combining the scaled variant representation of each block of transform coefficients together to form a combined representation of the scaled variant representation of each block of transform coefficients of the coefficient block-based digital image; and
- reducing the combined representation in size to a reduced-size representation of the combined representation by performing a matrix multiplication by a multiplier upon the combined representation, the multiplier forming a symmetric matrix having rows and columns that are divisible into pairs, the reduced-size representation of the first-reduced resolution.

15. The method of claim 14 wherein the combined representation formed during said operation of combining comprises a combined-representation matrix, and wherein said operation of reducing comprises the operation of multiplying the combined-representation matrix by a matrix multiplier, the reduced-size representation formed of the product of the combined-representation matrix and the matrix multiplier.

16. The method of claim 15 wherein the matrix multiplier by which the combined-representation is multiplied exhibits symmetry.

17. The method of claim 14 wherein said operation of scaling further comprises dequantizing the indications of each block of transform coefficients that together define the coefficient block-based digital image.

18. The method of claim 14 further comprising the operation of quantizing the reduced-size representation.

* * * * *